Patented May 21, 1940

2,201,700

UNITED STATES PATENT OFFICE 2,201,700

ABRASIVE COMPOSITION

Henry P. Nelson, Yonkers, N. Y.

No Drawing. Original application August 20, 1935, Serial No. 36,970. Divided and this application January 18, 1939, Serial No. 251,529

4 Claims. (Cl. 51—280)

This invention relates to a new composition of matter, and, more particularly to a self-hardening abrasive composition.

This application is a division of my application, Serial No. 36,970, filed August 20, 1935.

The composition of the present invention is one that is very easily prepared, and while in plastic condition may be molded to any desired shape. The composition will set and harden without special hardening or drying operations and when set and hardened is substantially as hard as previously proposed compounds which before they could be used were baked in kilns or were given heat treatments involving many operations.

The composition of the present invention is one that may be satisfactorily employed in any field of use where a hard friction or abrasive material is needed and as it can be easily molded to any desired shape without heat treatment, the articles formed of said composition may be easily and economically manufactured.

The composition bonds readily with natural stone as well as artificial stone and may be very effectively used as a wear-resisting nonslipping surface for stone floors and stair treads of all types.

The material of the present invention may be applied all over the surface of a new or worn tread or floor slab or it may be applied so as to merely fill in the worn areas of the tread or floor to bring the level of the same flush with the less worn surface. As the composition securely bonds with natural as well as artificial stone, it may be applied in extremely thin layers and trowelled to a feather edge without danger of the edge chipping or cracking. This application of my composition is more specifically described and claimed in my copending application above referred to.

The composition herein disclosed may also be used to form abrasive wheels of various types as the same can be easily molded and after hardening will present a work surface comparable with any of the previously proposed wheels. A wheel or the like formed of my new composition is extremely hard and will effectively resist the internal stresses produced by centrifugal forces on the wheel in operation.

The composition may also be formed into files with or without metal cores, a metal core being preferred, however, as it facilitates the securement of a suitable handle to the file body. In this use of my composition, the metal core is placed in the cavity of the mold, the mold cavity then being filled with my composition which is allowed to set and harden at atmospheric temperature and pressure. The files formed from my composition are extremely hard and can be used in all applications where ferrous alloy files are now used.

The composition comprises a cement, and a filler comprising such hard abrasive materials as silicon carbide, fused aluminum oxide (one form of which is commonly known as "Alundum"), or similar materials.

The cement is a modified oxychloride cement, the ingredients of which are as follows:

(a) A concentrated aqueous solution of magnesium chloride.

(b) Granular or powdered ingredients, which, when mixed, yield a mixture having substantially the following composition:

| | Per cent |
|---|---|
| Silicon dioxide | 47.60 |
| Zinc sulphide | 1.60 |
| Magnesium oxide | 39.25 |
| Iron and aluminum oxides | 2.60 |
| Calcium oxide | 1.80 |
| Constituents volatile on ignition | 3.60 |

This cement has been given the term "marble cement" and, although the preferred cement is one having the above enumerated ingredients in substantially the amounts indicated, any cement having the characteristics of the preferred cement may be used. The cement hereinafter will be designated "marble cement," it being understood that this term is generic and includes any cement having a similar composition as the preferred one.

The granular or powdered ingredients of the cement or hard abrasive material or materials are intimately intermixed and the solution of magnesium chloride then added in sufficient quantity to render the material plastic and workable. The material, while in plastic condition, can be formed into the desired final shape either by a molding process or if used as a wear-resisting, nonslipping surfacing material by trowelling the composition on the surface to be repaired and renovated.

It may be preferable to mix the dry ingredients of the cement with the magnesium chloride in solution and then add the abrasive materials. It has been found, however, particularly where the material is to be applied at a point distant from the source of manufacture, that dry ingredients be intermixed and shipped in one container and the liquid in another. The liquid can then be added to the dry material and thoroughly mixed at the place where my novel material is to be used.

The composition of the present invention is economical to prepare since the materials employed are not prohibitively costly and capable of being molded into the desired shape without the employment of costly apparatus and equipment. The composition will set and harden in approximately five to six hours without special drying or baking processes and when set is extremely hard. The composition will set and harden over a wide range of temperature and humidity range, as temperature and humidity are not critical factors in the setting process.

It has been found that the proportion of the abrasive material to the cement may be varied within large limits depending upon the use the composition is to be put, and that, while best results are obtained by using hard abrasive material of one size, uniformity in the size of the material employed is not essential and that material of varying sizes may be used together.

The proportion of cement to the hard abrasive material used may vary to meet varying conditions, but I have found that by volume five parts of hard abrasive material to two parts of cement made a satisfactory composition for almost all purposes.

In practicing the invention, however, unless the given proportions are adhered to, care should be taken not to increase the proportion of the marble cement and decrease the proportion of abrasive materials too much, for, unless there is sufficient predominance of abrasive material in the mixture, they will not be effective to render the composition sufficiently abrasive for the uses to which the composition and the articles formed thereof are to be employed. This is because the cement used when set and dried is very hard and smooth, and, if there is not a sufficient quantity of abrasive material to cause the finished surface to contain a predominance of abrasive material over the cement, a satisfactory abrasive surface will not be produced.

Variations and modifications may be made within the scope of this invention and portions of the improvements may be used without others.

I claim:

1. An abrasive composition including particles of abrasive material and a binder therefor comprising the reaction product of a magnesium oxychloride cement and zinc sulphide.

2. An abrasive composition having as its essential ingredients approximately two parts cement and five parts hard abrasive material, said cement comprising magnesium oxide, magnesium chloride and zinc sulphide.

3. A wear-resisting, nonslipping composition to be applied to stone treads or flooring and having for its essential ingredients an abrasive material and a binder therefor comprising the reaction product of a magnesium oxychloride cement containing zinc sulphide.

4. A wear-resisting, nonslipping composition to be applied to stone treads or flooring and having for its essential ingredients an abrasive material and a binder therefor comprising the reaction product of a magnesium oxychloride cement containing zinc sulphide in an amount substantially less than the amount of the cement.

HENRY P. NELSON.